United States Patent
Kulkarni et al.

(10) Patent No.: US 10,185,551 B2
(45) Date of Patent: Jan. 22, 2019

(54) FIRMWARE UPDATE

(71) Applicant: HEWLETT-PACKARD DEVELOPMENT COMPANY, L.P., Houston, TX (US)

(72) Inventors: Anand Kulkarni, Houston, TX (US); Stanley Hyojun Park, Houston, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/309,479

(22) PCT Filed: Jul. 2, 2014

(86) PCT No.: PCT/US2014/045210
§ 371 (c)(1),
(2) Date: Nov. 8, 2016

(87) PCT Pub. No.: WO2016/003455
PCT Pub. Date: Jan. 7, 2016

(65) Prior Publication Data
US 2017/0206077 A1    Jul. 20, 2017

(51) Int. Cl.
*G06F 9/44*    (2018.01)
*G06F 9/445*   (2018.01)
(Continued)

(52) U.S. Cl.
CPC .............. *G06F 8/65* (2013.01); *G06F 1/1601* (2013.01); *G06F 1/1684* (2013.01)

(58) Field of Classification Search
CPC .......... G06F 8/65; G06F 1/1601; G06F 1/1684
See application file for complete search history.

(56) References Cited

U.S. PATENT DOCUMENTS 7,149,692 B1 * 12/2006  Wu ..................... G06F 1/3203
                                                  704/270
7,171,658 B2    1/2007  Ha
(Continued)

FOREIGN PATENT DOCUMENTS

CN    103116501 A    5/2013

OTHER PUBLICATIONS

Choong-Bum Park, IEEE 802.15.4 based Service Configuration Mechanism for Smartphone, 2010, pp. 2004-2009. https://ieeexplore.ieee.org/stamp/stamp.jsp?tp=&arnumber=5606358 (Year: 2010).*
(Continued)

*Primary Examiner* — Mongbao Nguyen
(74) *Attorney, Agent, or Firm* — HPI Patent Department

(57) ABSTRACT

A separable computing system according to one example includes a display portion and a base portion. The display portion may include shared non-volatile memory to receive a base portion firmware update and a display portion private non-volatile memory to store the base portion firmware update. The display portion may further include a display portion embedded controller to send the base portion firmware update to a base portion embedded controller. The base portion may include and embedded controller to receive the base portion firmware update and a base portion private non-volatile memory to store the base portion firmware update.

9 Claims, 3 Drawing Sheets

(51) Int. Cl.
*G06F 8/65* (2018.01)
*G06F 1/16* (2006.01)

(56) References Cited

U.S. PATENT DOCUMENTS

| | | | |
|---|---|---|---|
| 8,539,472 B2* | 9/2013 | Fabregas | G06F 8/60 717/168 |
| 8,589,302 B2 | 11/2013 | Prakash et al. | |
| 8,607,219 B2 | 12/2013 | Minegishi | |
| 8,924,952 B1* | 12/2014 | Hou | G06F 8/654 717/172 |
| 9,069,641 B2* | 6/2015 | Parry | G06F 8/654 |
| 9,177,122 B1* | 11/2015 | Trier | G06F 21/572 |
| 9,519,786 B1* | 12/2016 | Laredo | G06F 8/654 |
| 2004/0015941 A1 | 1/2004 | Sekine | |
| 2004/0030877 A1 | 2/2004 | Frid | |
| 2004/0131133 A1* | 7/2004 | Charney | G06F 8/65 375/334 |
| 2005/0160257 A1 | 7/2005 | Kruger et al. | |
| 2006/0143600 A1* | 6/2006 | Cottrell | G06F 21/572 717/168 |
| 2007/0124508 A1 | 5/2007 | Lieb et al. | |
| 2009/0041438 A1* | 2/2009 | Kuno | G11B 19/02 386/235 |
| 2009/0222807 A1* | 9/2009 | Fu | G06F 8/65 717/168 |
| 2009/0241103 A1* | 9/2009 | Pennisi | G06F 8/65 717/173 |
| 2010/0023777 A1* | 1/2010 | Prevost | G06F 21/572 713/180 |
| 2011/0093622 A1* | 4/2011 | Hahn | G06F 17/30038 710/13 |
| 2011/0093839 A1* | 4/2011 | Murase | G06F 8/658 717/168 |
| 2012/0162058 A1* | 6/2012 | Davis | G06F 3/1438 345/156 |
| 2012/0166679 A1* | 6/2012 | Zawacki | G06F 13/10 710/8 |
| 2013/0036411 A1* | 2/2013 | Liu | G06F 8/65 717/168 |
| 2013/0162907 A1* | 6/2013 | Kim | H04N 5/44 348/553 |
| 2013/0174137 A1* | 7/2013 | Kim | G06F 8/65 717/171 |
| 2013/0179870 A1* | 7/2013 | Kelso | G06F 8/65 717/169 |
| 2013/0290946 A1 | 10/2013 | Iwadate | |
| 2013/0318394 A1 | 11/2013 | Wu et al. | |
| 2014/0068594 A1* | 3/2014 | Young | G06F 21/572 717/172 |
| 2014/0130034 A1* | 5/2014 | Subbu | G06F 8/665 717/172 |
| 2014/0137096 A1* | 5/2014 | Ueda | G06F 8/65 717/171 |
| 2014/0149973 A1* | 5/2014 | Walter | G06F 8/654 717/170 |
| 2014/0157085 A1 | 6/2014 | Shalvi et al. | |
| 2014/0189674 A1* | 7/2014 | Nagao | G06F 8/65 717/170 |
| 2014/0208092 A1* | 7/2014 | Huang | G06F 8/654 713/2 |
| 2015/0199190 A1* | 7/2015 | Spangler | G06F 8/654 713/2 |
| 2015/0378957 A1* | 12/2015 | Adams | G06F 13/4282 710/313 |
| 2016/0085960 A1* | 3/2016 | Priev | G06F 21/44 726/7 |

OTHER PUBLICATIONS

Dutta Gupta Tirtho, Web based Remote Operations on Inverters, 2009, pp. 261-264. https://ieeexplore.ieee.org/stamp/stamp.jsp?tp=&arnumber=5090133 (Year: 2009).*

Francisc Zavoda, Universal IED for Distribution Smart Grids, 2013, pp. 1-4. https://ieeexplore.ieee.org/stamp/stamp.jsp?tp=&arnumber=6683579 (Year: 2013).*

Mario Ribeiro, Architectures for Modular Smart Sensor Systems, 2012, pp. 1-7. https://ieeexplore.ieee.org/stamp/stamp.jsp?tp=&arnumber=6461670 (Year: 2012).*

* cited by examiner

FIRMWARE UPDATE

BACKGROUND

Separable computers can include a display portion, e.g., a screen portion, and a base portion, e.g., a host portion. The display portion and the base portion are separable from one another, e.g., the display portion may be detached from the base portion. When separated from the base portion, the detached display portion can be referred to as a tablet computing device.

DETAILED DESCRIPTION

Separable computing systems can include a display portion and a base portion. Both the display portion and the base portion can include a respective embedded controller. Because the respective embedded controllers, i.e. the embedded controller of the display portion and the embedded controller of the base portion, have different dedicated tasks, the respective embedded controllers utilize different firmware.

In previous separable computing systems, Basic Input/Output System (BIOS) running on a display portion of the device has been unable to directly access elements of the base portion, such as a private non-volatile memory of a base portion. For example, a BIOS update utility run by a CPU of a previous separable computing system cannot access a private non-volatile memory because the private non-volatile memory does not have the appropriate hardware connections. As such, previous separable computing systems have not provided secure firmware updates to the base portion.

Examples of the present disclosure include systems, devices, and methods for updating firmware, e.g., a base portion firmware update. For instance, such a method can include receiving, with a separable computing system having a display portion and a base portion, a BIOS update package that includes a base portion firmware update; storing, with a display portion shared non-volatile memory, the base portion firmware update; authenticating the base portion firmware update via a display portion embedded controller; storing, with a display portion private non-volatile memory, the base portion firmware update; sending, via the display portion embedded controller, the base portion firmware update to a base portion embedded controller; and running the base portion firmware update on the base portion.

Figure 1:
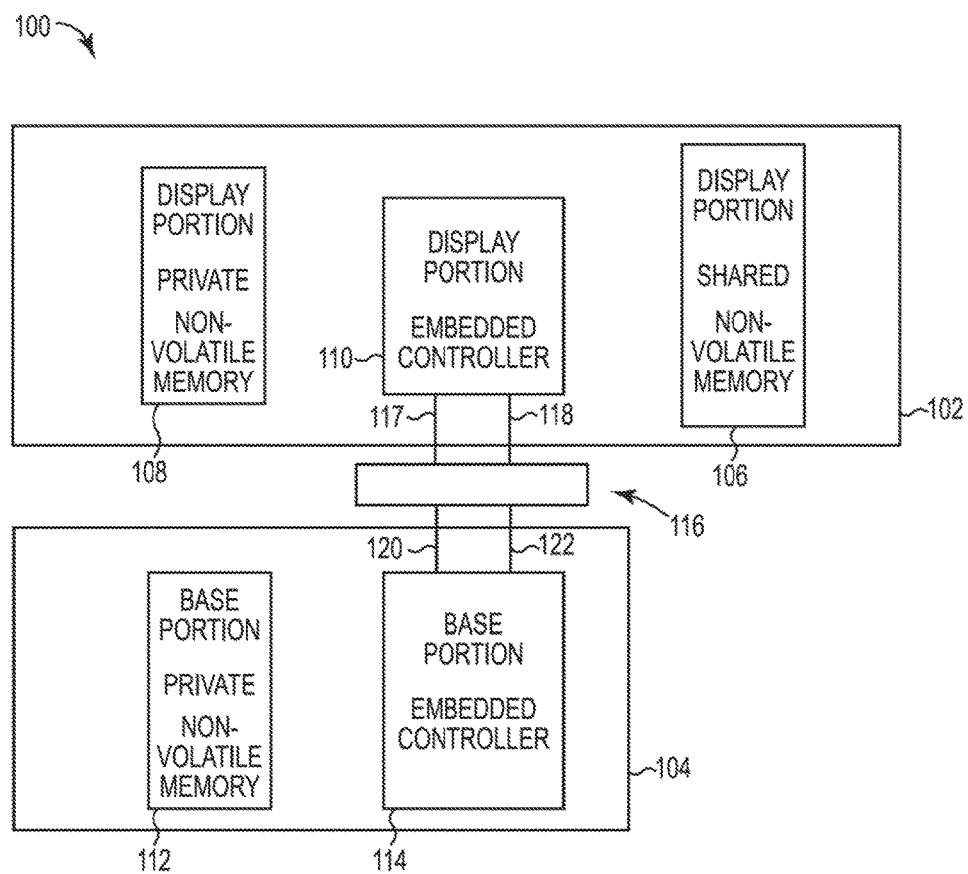
FIG. 1 illustrates a portion of an example of a separable computing system according to the present disclosure.

FIG. 1 illustrates a portion of an example of a separable computing system 100 according to the present disclosure. The separable computing system 100 can be referred to a convertible computing system or a hybrid computing system, among others.

The separable computing system 100 can include a display potion 102 and a base portion 104. The display portion 102 and the base portion 104 are separable from one another, e.g., the display portion 102 may be detached from and/or be operated independently of the base portion 104. When separated from the base portion 104, the detached display portion 102 can be referred to as a tablet computing device.

As illustrated in FIG. 1, the display portion 102 can include a display portion shared non-volatile memory 106. Flash memory is an example of non-volatile memory, among others. Non-volatile memory, e.g., display portion shared non-volatile memory 106, is memory that can provide persistent data by retaining stored data when the non-volatile memory is not powered. Some examples of the present disclosure provide that the non-volatile memory discussed herein is accessed using Serial Peripheral Interface (SPI) protocol. The display portion 102 can include display portion private non-volatile memory 108.

Shared non-volatile memory, e.g., display portion shared non-volatile memory 106, discussed further herein, may be accessed by both an embedded controller and a CPU; however, a shared non-volatile memory can only be accessed by an embedded controller, as discussed further herein, when the CPU is not powered; when the CPU is powered the memory can only be accessed by the CPU. Private non-volatile memory, e.g., display portion private non-volatile memory 108, can only be accessed by an embedded controller. For instance, the CPU cannot access private non-volatile memory, e.g., display portion private non-volatile memory 108 and base portion private non-volatile memory, discussed further herein.

The display portion 102 can include a display portion embedded controller 110. An embedded controller, which may also be referred to as an embedded system, is a controller having a number of dedicated tasks within a larger system, e.g. the separable computing system 100. Embedded controllers can control a number of peripheral devices, such as memories, converters, I/O expanders, LCD drivers, sensors, matrix switches, among others, for instance.

While not illustrated in FIG. 1, the display portion 102 can include, for example, a touch screen, a central processing unit (CPU), graphics processing unit (GPU), a storage unit, such as a hard drive, a speaker, a number of ports and or connectors, among other elements.

The base portion 104 can include a base portion private non-volatile memory 112 and a base portion embedded controller 114. While not illustrated in FIG. 1, the base portion 104 can include an input, e.g., a keyboard, a touchpad, a number of ports, and/or a number of connectors, among other elements. Some examples of the present disclosure provide that the base portion 104 does not include a generic processor; for instance the base portion 104 may only include a number of embedded controllers, such as base portion embedded controller 114.

The separable computing system 100 can include a connector 116. The connector 116 can couple the display portion 102 to the base portion 104. Some examples of the present disclosure provide that the connector 116 is an element of the display portion 102. Some examples of the present disclosure provide that the connector 116 is an element of the base portion 104. While FIG. 1 illustrates the connector 116 as a single element, which may be an element of the display portion 102 or an element of the base portion 104, examples of the present disclosure are not so limited. For instance, a first portion of the connector 116 may be an element of the display portion 102, while a second portion of the connector 116 may be an element of the base portion 104.

The separable computing system 100 can include a serial bus, e.g., a I2C bus. As illustrated in FIG. 1, the serial bus can include a display portion serial data line 117, a display portion serial clock 118, a base portion serial data line 120, and a base portion serial clock 118. The display portion embedded controller 110 may communicate, e.g., send and/or receive data, with the base portion embedded controller 114 via the serial bus by utilizing a protocol, for example. Similarly, the base portion embedded controller 114 may communicate with the display portion embedded controller 110 via the serial bus, for example. The serial bus, e.g. the display portion serial data line 116, the display portion serial clock 118, the base portion serial data line 120, and the base portion serial clock 118, can couple with the connector 116.

At times it may desirable to update the separable computing system 100. As an example, the separable computing system 100 can receive a BIOS update package. Examples of the present disclosure provide that the BIOS update package can be received from a network, e.g., a wired and/or wireless network such as a WI/FI network or other wireless network, a disc, or a universal serial bus (USB) memory device, for instance.

The BIOS update package can include a number of elements, e.g., a system BIOS update, a display portion firmware image, and/or a base portion firmware image. The display portion firmware image and the base portion firmware image are different. For instance, the display portion firmware image can run on the display portion embedded controller 110 and the base portion firmware image can run on the base portion embedded controller 114.

Examples of the present disclosure provide that the display portion shared non-volatile memory 106 can receive a BIOS update package, e.g., the system BIOS update, the display portion firmware image, and/or the base portion firmware image. The display portion shared non-volatile memory 106 can store the system BIOS update, the display portion firmware image, and/or the base portion firmware image.

Figure 2:
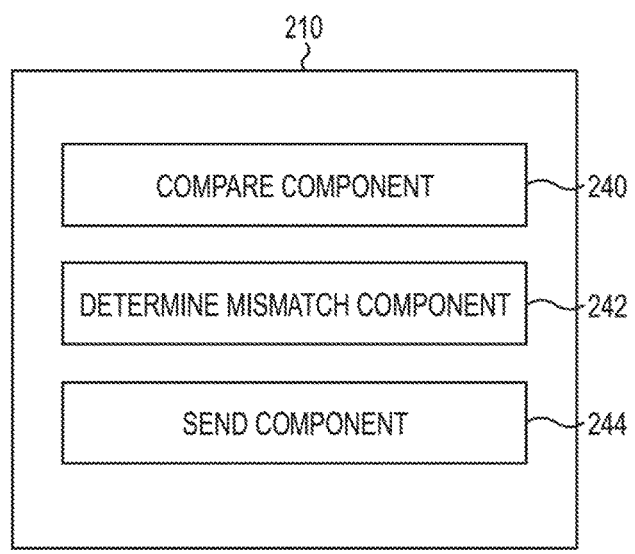
FIG. 2 illustrates a portion of a display portion embedded controller according to the present disclosure.

FIG. 2 illustrates a portion of an example, of a display portion embedded controller 210 according to the present disclosure. As mentioned, the display portion shared non-volatile memory can receive a BIOS update package from a network, a disc, or a universal serial bus (USB) memory device. Thereafter, the system BIOS update and the display portion firmware image, e.g., a display portion firmware update, can be implemented, to run on the display portion for instance.

The display portion embedded controller 210 can include a number of components. For example, the display portion embedded controller 210 can include a compare component 240, a determine mismatch component 242, and a send component 244, among other components.

The number of components can include hardware, programming, or a combination thereof to perform a number of functions described herein, e.g., compare a first base portion firmware image and a second base portion firmware image, determine a mismatch between the first base portion firmware image and the second base portion firmware image, send the second base position firmware image to the base portion, etc. Each of the components can include hardware, programming, or a combination thereof designated for a particular task. The programming can include instructions, e.g., software, firmware, etc., stored on a memory resource, e.g., computer-readable medium for instance, as well as a hard-wired program, e.g., logic. As an example, the display portion embedded controller 240 can include a processing device and memory with instructions thereon to perform a number of functions described herein, e.g., compare a first base portion firmware image and a second base portion firmware image, determine a mismatch between the first base portion firmware image and the second base portion, firmware image, send the second base position firmware image to the base portion, etc.

As mentioned, the display portion embedded controller 210 can include a compare component 240. The firmware image compare component 240 can compare a first base portion firmware image and a second base portion firmware image. For example, a first base portion firmware image running on a base portion, e.g. base portion 104 discussed with FIG. 1, may be compared to a second base portion firmware image, e.g., a base portion firmware image update that has been received by the display portion shared non-volatile memory 106 discussed with FIG. 1. Some examples of the present disclosure provide that the firmware image compare component 240 can compare a first base portion firmware image and a second base portion firmware image, where the second base portion firmware image is stored on a display portion private non-volatile memory, e.g., the display portion private non-volatile memory 108 discussed with FIG. 1. The display portion embedded controller 210 can include a determine mismatch component 242. The determine mismatch component 242 can determine a mismatch, e.g., a difference, between the first base portion firmware image and the second base portion firmware image. Some examples of the present disclosure provide that a determined mismatch, e.g. a determined difference, between the first base portion firmware image and the second base portion firmware image can indicate that the second base position firmware image is an update, e.g., an update of the first base position firmware image.

The display portion embedded controller 210 can include a send component 244. The send component 244 can send a base portion firmware image to a base portion, e.g., base portion 104 discussed with FIG. 1. For example, if a mismatch between a first base portion firmware image and a second base portion firmware image has been determined, the send component 244 can send the second base portion firmware image, e.g., an updated firmware image, to the base portion. As discussed herein, some examples of the present disclosure provide that a second base portion firmware image, e.g., a base portion firmware image stored on the display portion private non-volatile memory 108, can be sent to the base portion embedded controller 114 discussed with FIG. 1. As an example, the second base portion firmware image can be sent to the base portion utilizing a display portion to base portion communication protocol. Some examples of the present disclosure provide that the second base portion firmware image can be sent to the base portion in fragments having a fixed length. The second base portion firmware image can be sent to the base portion by via a serial bus, as discussed with FIG. 1.

Some examples of the present disclosure provide that the display portion embedded controller 210 can include an authenticate component, not shown in FIG. 2. The authenticate component can be utilized to authenticate a received firmware image, e.g., the authenticate component can verify that a received firmware image has a valid signature, among other ways to authenticate the received firmware image. Non-authenticated received firmware images can be isolated and/or deleted, e.g., deleted from the separable computing system.

Some examples of the present disclosure provide that the display portion embedded controller 210 can include a store component, not shown in FIG. 2. The store component can store a received firmware image, e.g., after the received firmware image has been authenticated by the authenticate component. The store component can store the firmware image on a display portion private non-volatile memory, e.g., the display portion private non-volatile memory 108 discussed with FIG. 1.

Figure 3:
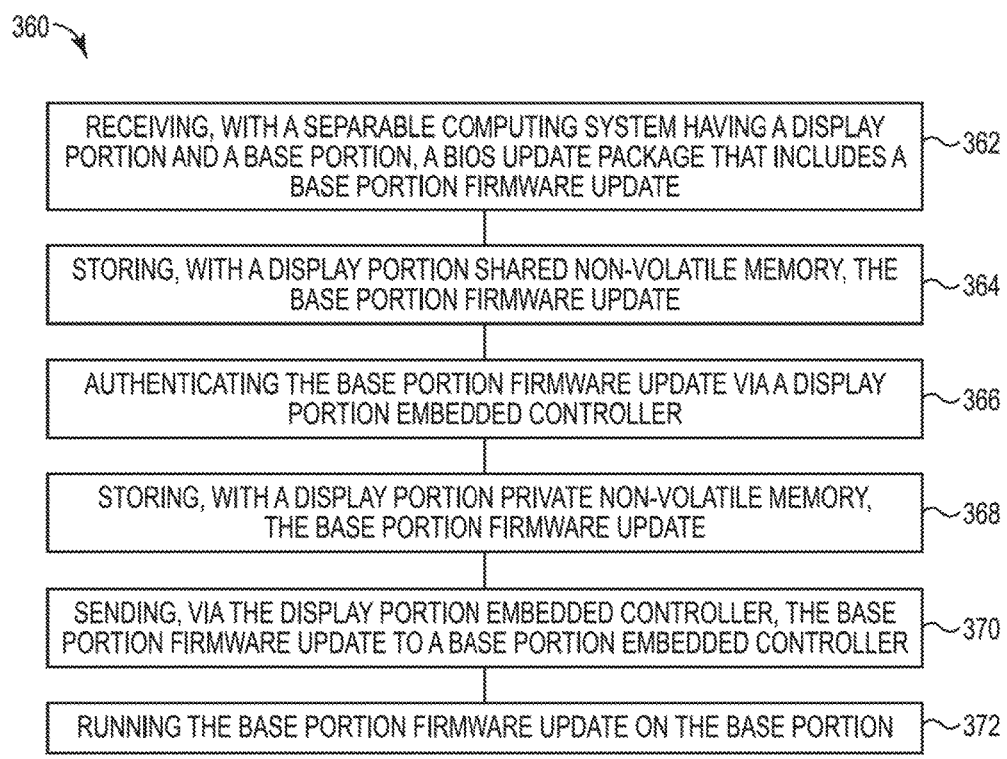
FIG. 3 illustrates a block diagram of an example of a method according to the present disclosure.

FIG. 3 illustrates a block diagram of an example of a method 360 according to the present disclosure. The method 360 may be utilized for a firmware update, e.g., a base portion firmware update.

At 362, the method 360 can include receiving, with a separable computing system having a display portion and a base portion, a BIOS update package that includes a base portion firmware update. As discussed herein, the BIOS update package can include a system BIOS update, a display portion firmware image, and/or a base portion firmware image. A display portion shared non-volatile memory can receive the BIOS update package.

At 364, the method 360 can include storing, with a display portion shared non-volatile memory, the base portion firmware update. As mentioned, display portion shared non-volatile memory can receive the BIOS update package, at which time there can be two base portion firmware images on the system, i.e., a base firmware images currently running on a base portion of the separable computing system and the recently received base portion firmware update.

At 366, the method 360 can include authenticating the base portion firmware update via a display portion embedded controller, Authenticating, the base portion firmware update can be utilized to help provide that malicious firmware is not implemented on the separable computing system.

At 368, the method 360 can include storing, with a display portion private non-volatile memory, the base portion firmware update. As mentioned, the base portion firmware update, e.g., upon authentication, can be stored in the display portion private non-volatile memory. Because the base portion firmware update is stored in the display portion private non-volatile memory, this stored base portion firmware update is not accessible by a display portion CPU, but is accessible to the display portion embedded controller. The display portion embedded controller can access the stored base portion firmware update independently of the power state of the separable computing system, e.g., display portion embedded controller can access the stored base portion firmware update when the separable computing system is powered on and/or when the separable computing system is powered off.

At 370, the method 360 can include sending, via the display portion embedded controller, the base portion firmware update to a base portion embedded controller. As mentioned, the base portion firmware update can be sent via a serial bus by utilizing a display portion to base portion communication protocol, for example.

At 372, the method 360 can include running the base portion firmware update on the base portion. For instance, the base portion firmware update, which has been sent to and received the base portion, can be stored with a base portion private non-volatile memory that is accessible by the base portion embedded controller. The base portion firmware update can replace previous firmware running on the base portion and the updated base portion firmware can be run on the base portion.

As used herein, "a" or "a number of" something can refer to one or more such things. For example, "a number of elements can refer to one or more elements. In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element in the drawing. Similar elements or components between different figures may be identified by the use of similar digits. For example, 110 may reference element "10" in FIG. 1, and a similar element may be referenced as 210 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

The above specification and examples provide a description of the methods and applications, and use of the systems and methods of the present disclosure. Since many examples can be made without departing from the spirit and scope of the systems and methods of the present disclosure, this specification merely sets forth some of the many possible embodiment configurations and implementations.

What is claimed is:

1. A method executed by a hardware processor, comprising:
   receiving, with a separable computing system having a display portion operable as a tablet while separated from a base portion, a BIOS update package that includes a base portion firmware update;
   storing, with a display portion shared non-volatile memory, the base portion firmware update;
   authenticating the base portion firmware update via a display portion embedded controller;
   storing, with a display portion private non-volatile memory, the base portion firmware update;
   sending, via the display portion embedded controller, the base portion firmware update to a base portion embedded controller and accessing the base portion firmware update when the separable computing system is powered off; and
   running, via the base portion embedded controller, the base portion firmware update on the base portion to replace a previous firmware on the base portion, wherein the base portion embedded controller and the display portion embedded controller are different controllers;
   storing, with a base portion private non-volatile memory, the base portion firmware update;
   wherein:
      the display portion shared non-volatile memory is to receive a display portion firmware update that is different than the base portion firmware update; and
      the base portion firmware update is sent to the base portion via an inter-integrated circuit (I2C) bus.

2. The method of claim 1, wherein the BIOS update package includes a display portion firmware update.

3. A separable computing system comprising:
   a display portion operable as a tablet while separated from a base portion comprising:
      a display portion shared non-volatile memory to receive a base portion firmware update;
      a display portion private non-volatile memory to store the base portion firmware update; and a display portion embedded controller to send the base portion firmware update to a base portion embedded controller and access the base portion firmware update when the separable computing system is powered off; and a base portion comprising:

the base portion embedded controller to receive the base portion firmware update from the display portion and run the base firmware update to replace a previous firmware on the base portion, wherein the base portion embedded controller and the display portion embedded controller are different controllers; and a base portion private non-volatile memory to store the base portion firmware update;

wherein:

the display portion shared non-volatile memory is to receive a display portion firmware update that is different than the base portion firmware update; and the base portion firmware update is sent to the base portion via an inter-integrated circuit (I2C) bus.

4. The separable computing system of claim 3, further comprising a connector to couple the display portion with the base portion.

5. A display portion of a separable computing system, the display portion operable as a tablet while separated from a base portion, the separable computing system comprising:

a hardware processor;

a display portion shared non-volatile memory to receive a second base portion firmware image;

a display portion private non-volatile memory to store the second base portion firmware image;

a memory with instructions thereon that when executed by the hardware processor causes the display portion embedded controller to:

compare a first base portion firmware image and a second base portion firmware image;

determine a mismatch between the first base portion firmware image and the second base portion firmware image; and send the second base portion firmware image to the base portion and access the second base portion firmware image when the separable computing system is powered off, wherein the second base portion firmware image is stored with the display portion shared non-volatile memory; and a base portion embedded controller to run the second base portion firmware image to replace the first base portion firmware image on the base portion, wherein the base portion embedded controller and the display portion embedded controller are different controllers;

wherein:

the display portion shared non-volatile memory is to receive a display portion firmware image that is different than the second base portion firmware image; and the second base portion firmware image is sent to the base portion via an inter-integrated circuit (I2C) bus.

6. The separable computing system of claim 5, wherein the display portion embedded controller is further to authenticate the second base portion firmware image.

7. The separable computing system of claim 5, wherein the display portion embedded controller is further to store the second base portion firmware image with a display portion private non-volatile memory.

8. The separable computing system of claim 5, wherein the second base portion firmware is an update to the first base portion firmware.

9. The separable computing system of claim 5, wherein the memory comprises further instructions that when executed cause the display portion embedded controller to send the second base position firmware image to a base portion embedded controller.

* * * * *